United States Patent Office 3,298,808
Patented Jan. 17, 1967

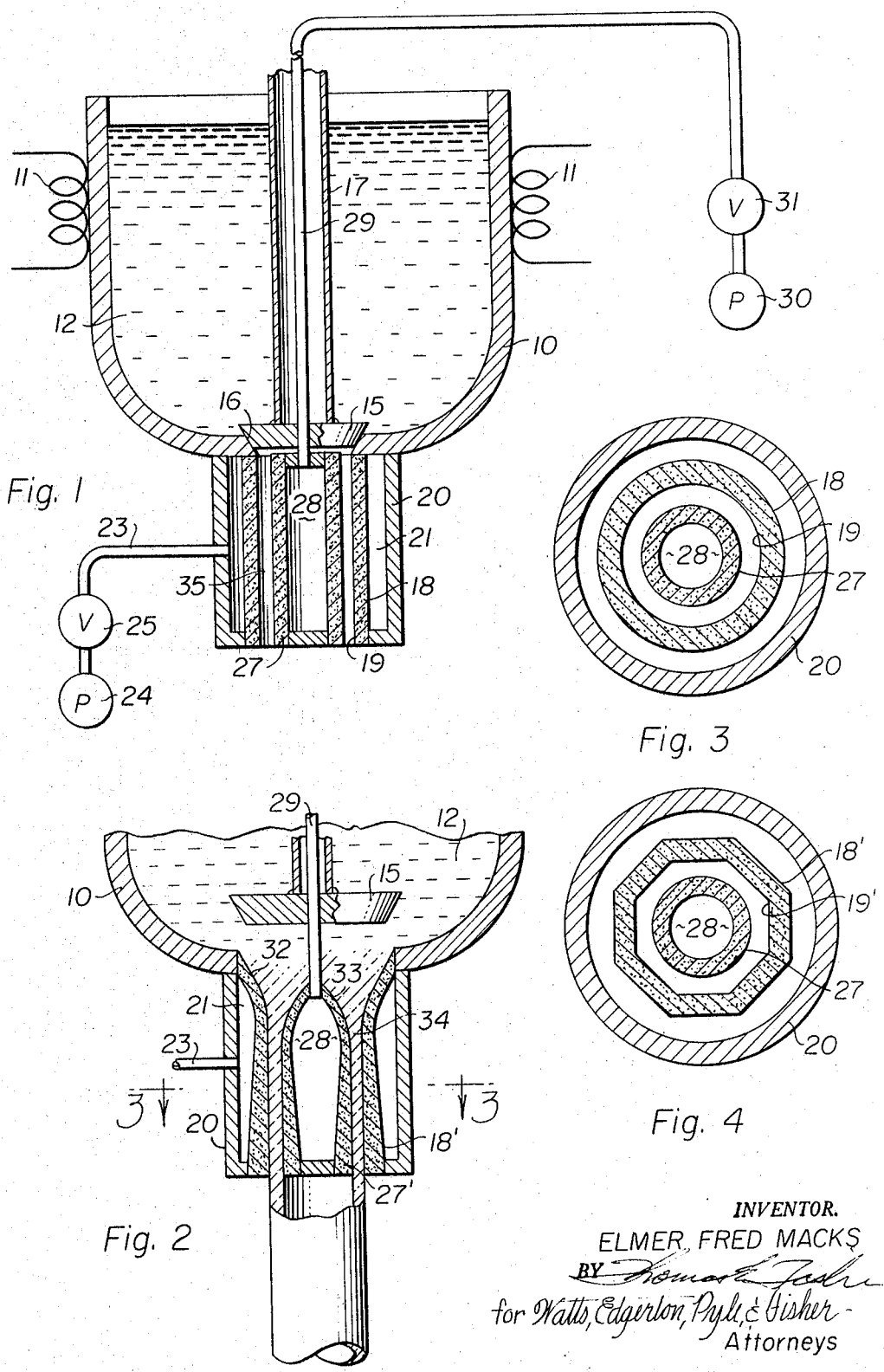

3,298,808
CONCENTRIC FORAMINOUS SHAPING MEANS
FOR TUBES OR BARS
Elmer Fred Macks, Willow Lane,
Vermilion, Ohio 44089
Continuation of application Ser. No. 353,016, Mar. 12,
1964, which is a continuation of application Ser. No.
50,939, Aug. 22, 1960. This application May 11, 1965,
Ser. No. 458,822
9 Claims. (Cl. 65—25)

This application is a continuation of application Ser. No. 353,016, entitled Continuous Molding Apparatus, filed Mar. 12, 1964, now abandoned in favor of this application, which originally was a continuation of application Ser. No. 50,939, entitled Continuous Molding Apparatus, filed Aug. 22, 1960, also abandoned.

This invention pertains to a method anl apparatus for precision forming of molten substances and more particularly to a novel and improved method and apparatus for precision molding of continuous shapes.

With this invention the material to be molded is disposed, while in a molten state, in a vessel. The vessel has an outlet port or gate through which the material passes. An external die in the form of a foraminous tube is secured to the vessel and surrounds the port. The foraminous tube receives material as it flows out of the port. The inner walls are of the contour of the object to be molded.

During a molding operation gas under pressure is passed through the walls of the foraminous tube to generate a gas film around the object being molded and between the object and the tube. The object is maintained in spaced relationship with the tube by this gas film, and the dimensions of the object can be controlled somewhat by adjusting the pressure of the gas film; thus a controlled taper may also be cyclically introduced.

When hollow objects are to be molded, a foraminous mandrel shaped to the contour of the inside surface of the object is provided. Gas under pressure is passed through the wall of the mandrel to form a gas film between the object and mandrel to keep the object being molded in spaced relationship with the mandrel on both inside and outside.

With a mechanism of the described construction, a very efficient, simple, high speed, continuous molding operation is obtained. The operation is smooth and continuous, and the material being molded is maintained out of contact with the molding dies. There is, therefore, a very long die life. There is also an ability to utilize materials for the dies which could not stand the heat encountered if the film of gas was not present as an insulating medium.

Accordingly, one of the principal objects of this invention is to provide a novel and improved method of and apparatus for continuously molding elongated members of essentially uniform cross section.

Another object of this invention is to provide an improved continuous molding method in which the dimensions of the object being molded may be controlled by adjusting the pressure of gas in a film formed between the object and foraminous dies defining the contour of the object being molded.

An additional object of this invention is to provide an improved method of molding in which the pressure head of the molten material to be molded is used to force the material through the object shaping dies.

A related object is to provide a novel and improved apparatus for molding and method of using such apparatus in which the pressure head is adjusted by applying either suction or pressure to the surface of the material to be molded.

Expressed another way, another object is to provide a pressurized gas above the molten pool to control velocity of out flow and thus maintain more uniform properties of finished product.

A further object of this invention is to provide a novel and improved method of continuously casting metal in which an inert gas is used to maintain the object being cast out of contact with the foraminous forming dies.

Another object of this invention is to provide an apparatus for molding with the described method in which the permeability of the walls of the molding dies increases from top to bottom to provide a film of gas of essentially uniform thickness and pressure from top to bottom.

Still another object is to provide a mechanism made in accordance with the foregoing objects in which a valve is provided at the gate and in which at least one of the dies tapers to provide a funnel-like entrance to the molding region.

Another object is to provide a mechanism made in accordance with any of the preceding objects in which fluid forming the film separating the object from the dies is introduced at a series of locations and temperatures to control the rate of flow and the rate of hardening.

Other objects and a fuller understanding of the invention may be had by referring to the following description and claims taken in conjunction with the accompanying drawings in which:

FIGURE 1 is a sectional view of the device in somewhat schematic form showing glass as the object being molded and the valve closed;

FIGURE 2 is a foreshortened sectional view of the molding portion of the mechanism with the valve in an open position and showing the molding process in operation and also showing slightly modified forming dies;

FIGURE 3 is a sectional view of the device as seen from the plane indicated by the line 3—3 of FIGURE 2;

FIGURE 4 is a sectional view of the device similar to the view of FIGURE 3 and showing molding dies to shape an object of another configuration; and, FIGURE 5 is a sectional view on an enlarged scale showing a mechanism with a controlled rate of flow and a controlled rate of solidification.

Figure 5:
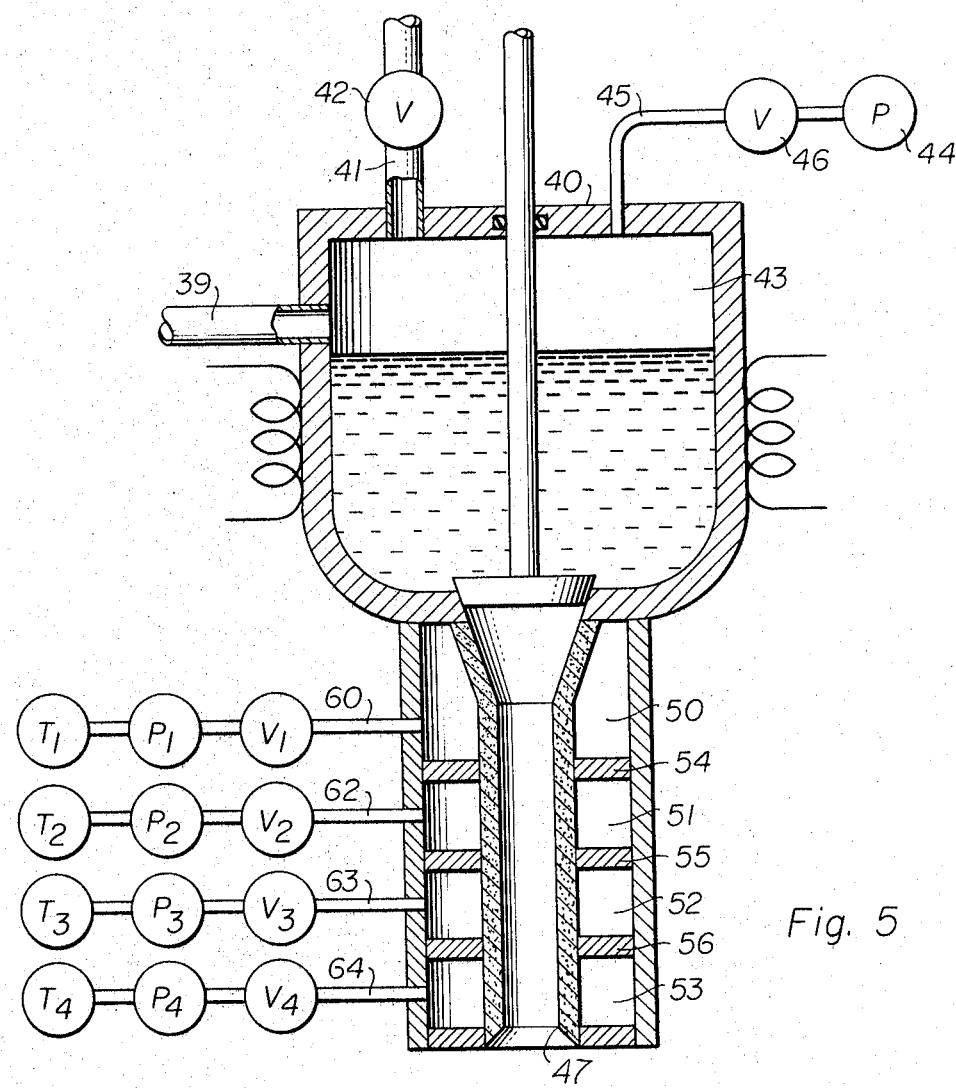

Referring now to the drawings and to FIGURE 1 in particular, a material supporting vessel is shown generally at 10. The vessel may include heaters 11 to maintain in a molten state material 12 carried by the vessel. In the drawings the molten material 12 is glass, because the method and apparatus of this invention is ideally suited for the shaping of glass bars and tubes, refractory metals, etc.

The vessel has a port or gate 15 preferably at the base thereof. When an object is not being molded, the gate 15 is closed by a valve 16. The valve 16 is shiftable from the closed position of FIGURE 2 by actuation of a suitable control means such as lift bars 17. This valve 16 may be eliminated where the process is continuous.

An exterior forming die in the form of a foraminous tube 18 is provided. The tube has an inner surface 19 which is contoured to the shape of the object to be molded. The surface 19 may, of course, have any of a wide variety of forms. As illustrative examples, the surface 19 of FIGURE 3 is cylindrical while the surface 19' of FIGURE 4 is octagonal.

A housing 20 surrounds the tube 18 to define a fluid chamber 21 therebetween. A conduit 23 connects the chamber 20 to a source of fluid under pressure 24. A control valve 25 is connected to the conduit 23.

When the object to be molded is hollow, a foraminous internal die or mandrel 27 is provided. The mandrel 27 will normally be positioned concentrically with respect to the surface 19 to provide a uniform molding space 35 therebetween and, therefore, a finished object of uniform cross section. Gas under pressure is supplied to a chamber 28 in the interior of the mandrel by a conduit 29. The conduit 29 is connected to a source of gas under pressure 30. A valve 31 is connected to the conduit 29 to control the flow of gas therethrough.

In FIGURE 2 the tube and mandrel each take a slightly modified form, and for this reason they are designated by the numerals 18' and 27' respectively. The tube and mandrel flare inwardly in funnel-like fashion at 32 and 33 to a throat at 34. These inward flares are provided to facilitate the flow of the material 12 into the molding region defined by the tube and mandrel.

The tube and mandrel 18' and 27' are modified in another respect. The wall thickness of the two gradually increases from top to bottom to provide permeability which also gradually decreases from top to bottom. With this mechanism the gas flowing through the foraminous walls will thereafter flow outwardly with the object being formed. With permeability that decreases from top to bottom, the gas flow through the foraminous walls will decrease from top to bottom. The decreasing permeability tends to produce a gas support film of uniform thickness and pressure between the walls and the object from top to bottom.

The tube and mandrel 18, 27 may be formed of sintered metal. The metal used will depend on the molding temperature encountered. Permeable stainless steel, for example, may be used for molding certain glass objects. Dies of permeable ceramic such as aluminum oxide ($Al_2O_3$) may be used for high temperature melting materials such as bronzes, steels, etc.

In operation film support gas under pressure is first introduced into the chambers 21, 28. This gas may be air. Molding may be accomplished in an inert atmosphere merely by employing an inert gas as the film support fluid. If oxidization of the material is desired, the gas may contain more oxygen than air.

When gas under pressure is in the chambers and flowing through the walls 18, 27, the valve 16 may be opened to allow the glass or other material 12 to gravity flow out of the vessel 10 and through the gate 15. As will be explained in greater detail in connection with FIGURE 4, the top of the vessel 10 may be sealed and pressurized or a vacuum drawn to control the velocity of flow.

A film of gas will form between the surface 19 and the elongated object being formed. If the object is hollow, the mandrel 27 is present and a second film will form between the mandrel 27 and the object. It is important the films be present at least as high in the molding region 35 as the location where the material begins to solidify. The films may form above this location, but if they only form below it, imperfect molding will result.

The tube and mandrel are of sufficient length so that the material is fully solidified before it passes out of the molding region 35. A suitable cut-off mechanism, not shown, may be positioned immediately below the region 35 to cut the finished objects to suitable lengths. Similarly, a support mechanism, also not shown, may be provided if the desired finished lengths are of such length that their weight affects the molding operation. Objects of specified length may be continuously molded merely by control of valve 16 in an open-close cycle of predetermined duration.

One of the outstanding advantages of this invention is that the size tolerances of the finished object may be very simply and expeditiously controlled within certain limits. If the thickness of the objects being formed is too great, the pressure in the chambers 21, 28 and, therefore, in the films, may be increased. If the object thickness is too small, then one or both of the pressures may be decreased. If only the inside or the outside diameter of the object is incorrect, then only the appropriate one of the chamber pressures need be altered.

In FIGURE 5 the vessel 10 is closed by a cover 40. Material may be introduced into the vessel through conduit 41 when a control valve 42 is open. A slag removal tap is provided at 39. The pressure in space 43 above the molten material 12 is controlled by a pressure control means 44. The pressure control means 44 may be either a suction or a pressure source. The pressure control means is in communication with the space 43 through a conduit 45. The pressure control means is regulated by a valve 46.

In FIGURE 5 the tubular die is designated by the numeral 47. The die 47 is surrounded by a series of chambers 50, 51, 52, 53, which are separated by baffles 54, 55, 56. The chambers 50, 51, 52, 53 are supplied gas under pressure by conduits 60, 62, 63, 64, respectively. The conduits 60, 62, 63, 64 are supplied by sources P–1, P–2, P–3, P–4, respectively, and controlled by valves V–1, V–2, V–3, V–4. The temperature of the gas in these conduits may be controlled by suitable means T–1, T–2, T–3, T–4. Thus, both the rate of hardening and the rate of flow of the material being molded may be controlled.

While the invention has been described with a great deal of detail, it is believed that it essentially comprises a mechanism for molding including a vessel having a gate, foraminous tubular die means positioned around and below the gate, and means to pass a fluid under pressure through the walls of the foraminous tube. The invention also includes a method of using such a mechanism.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A molding apparatus comprising:
    (a) a vessel for containing a quantity of molten material to be molded, said vessel having a gate opening in a lower portion thereof;
    (b) a foraminous tube secured to the vessel and surrounding and below said opening to receive material passed through such opening;
    (c) the tube defining a molding region and having an inner surface of uniform cross section from one end of the region to the other, said uniform cross section being of the contour of an object to be molded;
    (d) a member surrounding the tube and defining a fluid chamber between the member and the tube;
    (e) means connected to the member to supply fluid under pressure to the chamber and cause fluid under pressure to flow through the foraminous tube;
    (f) a foraminous mandrel having an internal fluid chamber suspended in the tube in spaced relationship with said inner surface;
    (g) the mandrel having an outer surface of uniform cross section from one end of the molding region to the other of the contour of the interior of a tubular object to be molded;
    (h) the mandrel having an internal chamber;
    (i) a fluid supply means connected to the mandrel to supply fluid under pressure to the mandrel chamber; and,
    (j) means for controlling the pressure of the gas supplied by each of said supply means and thereby control the dimension of an object being molded.
2. The device of claim 1 wherein the mandrel and tube are dies and wherein at least one of the dies has decreasing permeability from top to bottom.
3. The method of continuously molding an elongated object comprising:
    (a) providing a quantity of molten material;
    (b) shaping the material into an elongated member of constant cross-sectional configuration by continuously feeding the material through a molding region with force applied by the molten material and the region defined by a foraminous tube shaped to the contour of the object being molded;

(c) solidifying the material as it moves through said region by confining the material in the region until it solidifies to its finished shape; and, (d) maintaining a thin circumscribing film of moving gas around the entire object being molded from one end of the region to the other by continuously passing gas from a plurality of spaced sources of gas under pressure through the walls of the foraminous tube.

4. The method of claim 3 wherein the temperature and pressure gradients in the film are controlled by independently adjusting the temperature and pressure of each of the gas sources.

5. The method of claim 3 wherein the rate of solidification of the member is controlled by independently controlling the temperature of the gas from each of said sources.

6. A molding apparatus comprising:
(a) a vessel for containing a quantity of molten material to be molded, said vessel having a gate opening in a lower portion thereof;
(b) a foraminous tube secured to the vessel and surrounding and below said opening to receive material passed through such opening, the tube having inner and outer surfaces;
(c) the tube inner surface defining a molding region of uniform cross section from one end of the region to the other, said uniform cross section being of the contour of an object to be molded;
(d) means surrounding the tube and defining a plurality of fluid chambers adjacent the tube outer surface; and,
(e) a plurality of fluid supply means respectively connected to the chambers to supply fluid under pressure to the chamber and cause fluid under pressure to flow through the foraminous tube.

7. The device of claim 6 wherein the means for controlling both the temperature and pressure of the fluid supplied connected to each supply means.

8. The device of claim 6 wherein a foraminous mandrel is within the tube and a means to supply fluid under pressure is connected to the tube.

9. The method of continuously molding an elongated object comprising:
(a) providing a quantity of molten material;
(b) shaping the material into an elongated member of constant cross-sectional configuration by continuously feeding the material through a molding region with force applied by the molten material with the region defined by a foraminous tube shaped to the contour of the object being molded;
(c) solidifying the material as it moves through said region by confining the material in the region until it solidifies to its finished shape;
(d) maintaining a thin circumscribing film of moving gas around the entire object being molded from one end of the region to the other by continuously passing gas under pressure through the walls of the foraminous tube;
(e) maintaining the object in the region until it has solidified to its finished shape; and,
(f) controlling the thickness of the member by adjusting the pressure of the gas passed under pressure through the walls of the foraminous tube.

References Cited by the Examiner
UNITED STATES PATENTS

| | | | |
|---|---|---|---|
| 1,653,848 | 12/1927 | Grotta | 65—86 |
| 1,750,971 | 3/1930 | Soubier | 65—86 |
| 2,444,731 | 7/1948 | Devol | 65—25 |
| 2,478,090 | 8/1949 | Devol | 65—25 |

DONALL H. SYLVESTER, *Primary Examiner.*

F. W. MIGA, *Assistant Examiner.*